(12) United States Patent
Hennings et al.

(10) Patent No.: US 8,803,379 B2
(45) Date of Patent: Aug. 12, 2014

(54) COOLING DEVICE FOR AN ELECTRIC MACHINE ARRANGEMENT

(75) Inventors: Stephan Hennings, Leonberg (DE); Jonas Hohenstein, Ludwigsburg-Ossweil (DE); Jochen Schmid, Sersheim (DE); Christian Wendl, Ditzingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 249 days.

(21) Appl. No.: 12/912,855

(22) Filed: Oct. 27, 2010

(65) Prior Publication Data

US 2011/0101802 A1    May 5, 2011

(30) Foreign Application Priority Data

Nov. 4, 2009   (DE) .................. 10 2009 051 881

(51) Int. Cl.
  *H02K 9/19*      (2006.01)
(52) U.S. Cl.
  USPC .................. 310/54; 310/58; 310/59
(58) Field of Classification Search
  USPC .................... 310/52, 54, 64, 57–59
  See application file for complete search history.

(56) References Cited

U.S. PATENT DOCUMENTS

| | | | | |
|---|---|---|---|---|
| 3,009,072 A * | 11/1961 | Mossay | ........................... | 310/57 |
| 3,127,530 A * | 3/1964 | White | ............................. | 310/54 |
| 3,184,624 A * | 5/1965 | Solomon | ........................ | 310/54 |
| 4,728,840 A * | 3/1988 | Newhouse | .................... | 310/113 |
| 5,856,716 A * | 1/1999 | Coupart et al. | ................. | 310/54 |
| 6,222,289 B1 * | 4/2001 | Adames | ......................... | 310/54 |
| 6,231,407 B1 | 5/2001 | Hein et al. | | |
| 7,009,317 B2 | 3/2006 | Cronin et al. | | |
| 7,745,965 B2 | 6/2010 | Oestreich | | |

FOREIGN PATENT DOCUMENTS

| | | |
|---|---|---|
| JP | 9308183 | 11/1997 |
| JP | 2001251814 | 9/2001 |

* cited by examiner

*Primary Examiner* — Quyen Leung
*Assistant Examiner* — Naishadh Desai
(74) *Attorney, Agent, or Firm* — Gerald E. Hespos; Michael J. Porco; Matthew T. Hespos

(57) ABSTRACT

A cooling device (1) is provided for an electric machine arrangement (M) that has two electric machines (m1, m2). The cooling device (1) has cooling ducts that run helically around the electric machine arrangement (M). Two openings (7, 9) are arranged at one end (11) of the cooling device (1) and permit an entry and exit of a stream of cooling medium. As a result, the cooling device (1) is particular effective with respect to temperature distribution.

9 Claims, 1 Drawing Sheet

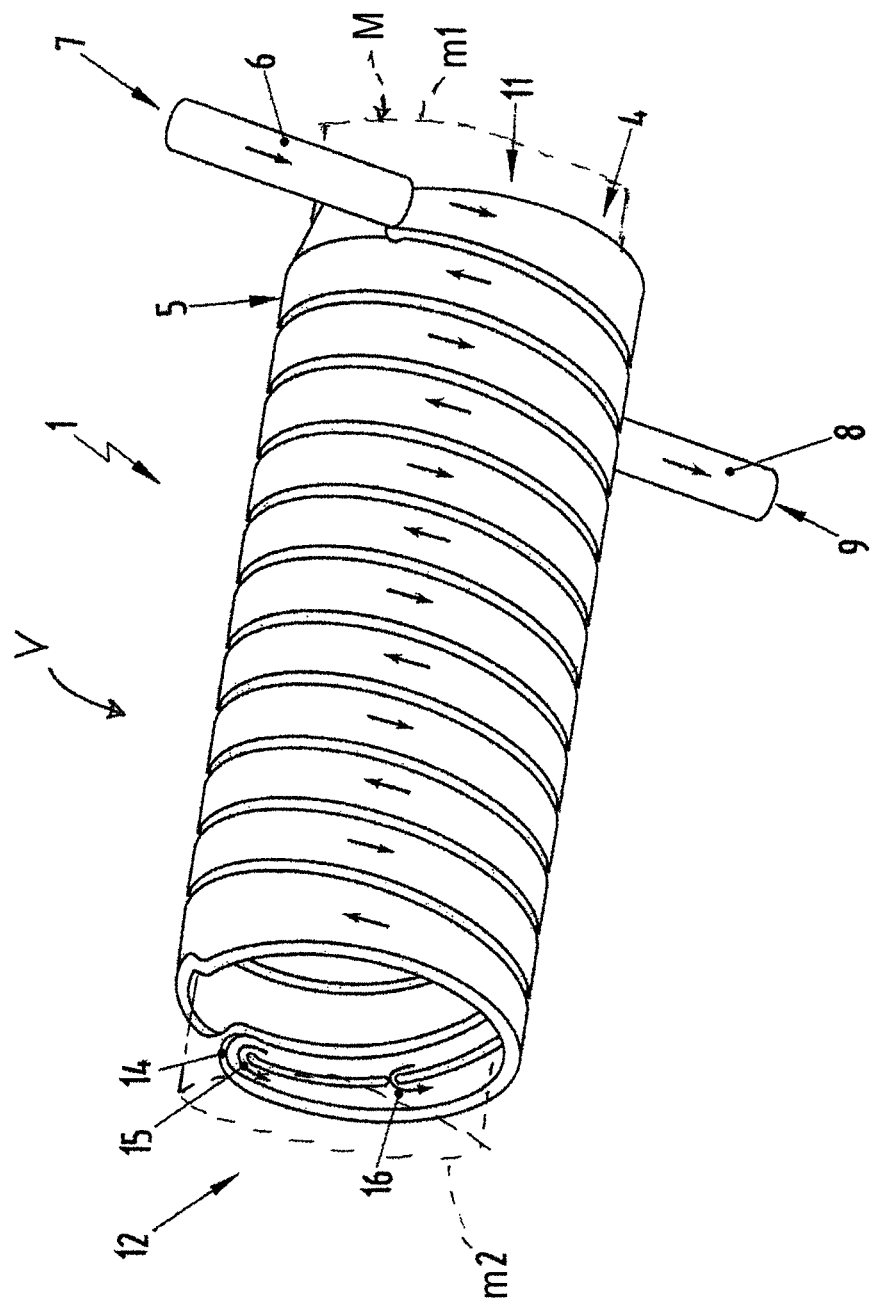

COOLING DEVICE FOR AN ELECTRIC MACHINE ARRANGEMENT

CROSS-REFERENCE TO RELATED APPLICATION

This application claims priority under 35 USC 119 to German Patent Application No. 10 2009 051 881.9 filed Nov. 4, 2009, the entire disclosure of which is incorporated herein by reference.

BACKGROUND OF THE INVENTION

1. Field of the Invention

The invention relates to a cooling device for an electric machine arrangement that has at least one electric machine. The invention also relates to an electric machine arrangement having at least one electric machine surrounded by a cooling device and to a motor vehicle having such an electric machine arrangement.

2. Description of the Related Art

U.S. Pat. No. 6,231,407 B1 discloses an electric drive device for a ship. The drive device has a stator positively locked into a housing component which has a favorable configuration in terms of flow and is associated with a housing around which water flows for cooling.

The object of the invention is to improve the cooling of an electric machine arrangement, in particular with regard to temperature distribution.

SUMMARY OF THE INVENTION

The invention relates to a cooling device for an electric machine arrangement. The electric machine arrangement has at least one electric machine surrounded on its outer circumferential face by the cooling device. The cooling device has two openings that permit entry and exit of a stream of cooling medium that flows around the cooling device for the purpose of cooling. More particularly, the cooling device has cooling ducts that run helically around the electric machine arrangement. Two openings are arranged at one end of the cooling device to permit entry and exit of the stream of cooling medium. The cooling ducts may be bounded by a hose-like cooling element that has turns lying one next to the other in the manner of a coil and surrounds the electric machine arrangement in the form of a jacket. The inventive arrangement with the openings at one end of the cooling device enables a flow through the cooling ducts in opposite directions and brings about a homogeneous temperature distribution in the cooling device.

The cooling device preferably comprises two cooling coils that extend helically around the electric machine arrangement. Each cooling coil preferably has a cross section in the shape of an elongate generally rectangular or oblong hole that is rounded at the short sides.

The cooling device is defined so that the stream of cooling medium flows through the two cooling coils in opposite directions. The flow through the cooling coils in opposite directions provides a water jacket around the electric machine arrangement and a very uniform flow through which water jacket.

The two coiling coils of the cooling device preferably wind around the electric machine arrangement one next to the other in two turns. The two cooling coils preferably have the same cross section.

Each of the two cooling coils preferably has one of the two openings at a first end of the cooling device. The openings define an inlet opening and an outlet opening to permit the entry and exit of the stream of cooling medium. The direction of flow through the cooling coils can be reversed by changing the connections.

The two cooling coils of the cooling device preferably are connected to one another at a second end of the cooling device. More particularly, the two cooling coils merge with one another at a connecting region at the second end. The stream of cooling medium is deflected at least one at deflection point in the connecting region.

The two cooling coils may be connected to one another at an additional deflection point in the vicinity of the second end. The additional connection preferably has a second deflection point at which the stream of cooling medium is deflected from one cooling coil into the other cooling coil.

The invention also relates to an electric machine arrangement having at least one electric machine surrounded by the above-described cooling device. The electric machine preferably functions to drive a wheel or an axle of an electric vehicle or of a hybrid vehicle.

The electric machine arrangement preferably comprises two electric machines surrounded by the above-described cooling device. The two electric machines preferably are arranged one next to the other in the longitudinal direction and together have a substantially straight circular cylindrical shape. The cooling device, through which there is a flow in opposite directions, preferably has the shape of a substantially circular cylinder jacket that extends around the straight circular cylinder defined by the two electric machines.

The invention relates to a motor vehicle having the above-described electric machine arrangement. The motor vehicle preferably is an electric vehicle or hybrid vehicle and the electric machine arrangement drives at least one wheel or at least one axle.

Further advantages, features and details of the invention emerge from the following description in which an exemplary embodiment is described in detail with reference to the drawing.

BRIEF DESCRIPTION OF THE DRAWING

FIG. 1 is a perspective illustration of a cooling device according to the invention.

DETAILED DESCRIPTION OF THE PREFERRED EMBODIMENT

A cooling device 1 according to the invention is identified generally by the reference numeral 1 in FIG. 1 and has opposite first and second ends 11 and 12. The cooling device 1 comprises first and second cooling coils 4 and 5 that are wound helically around an electric machine arrangement M to form a cooling jacket through which a stream of cooling medium flows.

The first cooling coil 4 has an inlet connector 6 at one end with an opening 7 through which a stream of cooling medium enters the cooling device 1. Analogously, the second cooling coil 5 has an outlet connector 8 at one end with an opening 9 through which the stream of cooling medium exits the cooling device 1. The two connectors 6, 8 with the openings 7, 9 are arranged together at the first end 11 of the cooling device 1.

The two cooling coils 4, 5 merge with one another in a connecting region 14 at the second end 12 of the cooling device 1. The stream of cooling medium is deflected at least at two deflection points in the connecting region 14, as is indicated by arrows 15, 16.

The two cooling coils 4, 5 of the cooling device 1 define an inner receptacle space that has the shape of a straight circular cylinder. The receptacle space is configured to accommodate an electric machine arrangement M that is configured substantially as a straight circular cylinder. The electric machine arrangement M preferably comprises two electric machines m1, m2 that are located one next to the other in the longitudinal direction. The two electric machines m1, m2 preferably function to drive an electric vehicle or hybrid vehicle V.

The cooling device 1 can bring about particularly homogeneous temperature distribution in the two cooling coils 4, 5. As a result, the electric machine arrangement M arranged inside the cooling device 1 can be cooled in a particularly uniform way. The flow through the cooling device 1 in opposite directions ensures that the two electric machines m1, m2 are kept at approximately the same temperature, which is necessary for uniform functioning of the electric machines m1, m2.

What is claimed is:

1. A cooling device for an electric machine arrangement that has at least one electric machine and an outer circumferential face, the cooling device, comprising: opposite first and second ends, first and second cooling coils that run helically around the outer circumferential face of the electric machine arrangement substantially from the first end to the second end, the first cooling coil having a first opening at the first end of the cooling device to permit an entry of a stream of a cooling medium and the second of the cooling coils having a second opening at the first end of the cooling device to permit an exit of a stream of a cooling medium, the first and second cooling coils being connected directly to one another at a first locations at ends of the first and second cooling coils opposite the first and second openings and in proximity to the second end of the cooling device, the first and second cooling coils further being connected directly to one another at a second location spaced circumferentially from the first location to define at least first and second circumferentially spaced deflection points each of which accommodates a return flow of the cooling medium from the first coil to the second coil, and the first cooling coils being substantially adjacent the second cooling coils to define a cooling jacket around the outer circumferential face of the electric machine arrangement.

2. The cooling device of claim 1, wherein the two cooling coils are arranged respectively to accommodate a flow of the cooling medium in opposite directions.

3. An electric machine arrangement comprising:
at least one electric machine having an outer circumferential surface; and
a cooling device surrounding the outer circumferential surface of the electric machine, the cooling device having opposite first and second ends, first and second cooling coils that run helically around the electric machine substantially from the first end to the second end of the cooling device, the first cooling coil having a first opening at the first end of the cooling device to permit an entry of a stream of a cooling medium and the second coiling coil having a second opening at the first end of the cooling device to permit an exit of a stream of a cooling medium, the first and second cooling coils being connected directly to one another at least at a first locations at ends of the first and second cooling coils opposite the first and second openings and in proximity to the second end of the cooling device, the first and second cooling coils further being connected directly to one another at a second location spaced circumferentially from the first location to define at least first and second circumferentially spaced deflection points each of which accommodates a return flow of the cooling medium from the first coil to the second coil, and the first cooling coils being substantially adjacent the second cooling coils to define a cooling jacket around the outer circumferential surface of the electric machine arrangement.

4. The electric machine of claim 3, wherein the at least one electric machine comprises first and second electric machines arranged next to one another and in proximity respectively to the first and second ends of the cooling device.

5. A motor vehicle, comprising:
an electric machine arrangement having at least one electric machine having an outer circumferential surface; and
a cooling device surrounding the outer circumferential surface of the electric machine, the cooling device having opposite first and second ends, first and second cooling coils that run helically around the electric machine substantially from the first end to the second end of the cooling device, the first cooling coil having a first opening at the first end of the cooling device to permit an entry of a stream of a cooling medium and the second coiling coil having a second opening at the first end of the cooling device to permit an exit of a stream of a cooling medium, the first and second cooling coils being connected directly to one another at least at a first locations at ends of the first and second cooling coils opposite the first and second openings and in proximity to the second end of the cooling device, the first and second cooling coils further being connected directly to one another at a second location spaced circumferentially from the first location to define at least first and second circumferentially spaced deflection points each of which accommodates a return flow of the cooling medium from the first coil to the second coil and the first cooling coils being substantially adjacent the second cooling coils to define a cooling jacket around the outer circumferential surface of the electric machine arrangement.

6. The motor vehicle of claim 5, wherein the at least one electric machine comprises first and second electric machines arranged next to one another and in proximity respectively to the first and second ends of the cooling device.

7. The cooling device of claim 1, wherein the first and second cooling coils each have opposite inner and outer circumferential walls and opposite first and second side walls extending unitarily between the inner and outer circumferential walls, and each of the first and second side walls of the first cooling coil are adjacent to one of the first and second side walls of the second cooling coil.

8. The electric machine arrangement of claim 3, wherein the first and second cooling coils each have opposite inner and outer circumferential walls and opposite first and second side walls extending unitarily between the inner and outer circumferential walls, and each of the first and second side walls of the first cooling coil are adjacent to one of the first and second side walls of the second cooling coil.

9. The motor vehicle of claim 5, wherein the first and second cooling coils each have opposite inner and outer circumferential walls and opposite first and second side walls extending unitarily between the inner and outer circumferential walls, and each of the first and second side walls of the first cooling coil are adjacent to one of the first and second side walls of the second cooling coil.

* * * * *